United States Patent [19]
Pechman

[11] Patent Number: 5,944,347
[45] Date of Patent: Aug. 31, 1999

[54] AUTOMOBILE HOOD COVER

[76] Inventor: David C. Pechman, 1158 Crystal Lake Way, Lakeport, Calif. 95453

[21] Appl. No.: 08/878,295

[22] Filed: Jun. 18, 1997

Related U.S. Application Data

[63] Continuation-in-part of application No. 29/044,244, Sep. 21, 1995, abandoned.

[51] Int. Cl.[6] ..................................................... B60R 11/06
[52] U.S. Cl. ......................... 280/770; 280/850; 150/166
[58] Field of Search ................................... 280/770, 850; 296/136, 95.1; 293/128; 428/900, 100; 150/166

[56] References Cited

U.S. PATENT DOCUMENTS

| | | | |
|---|---|---|---|
| 4,219,218 | 8/1980 | Waldon | 280/770 |
| 4,589,459 | 5/1986 | Lantrip | 296/136 |
| 4,953,909 | 9/1990 | Crane | 280/770 |
| 4,997,229 | 3/1991 | Swanson | 296/136 |
| 5,056,817 | 10/1991 | Fuller | 280/770 |
| 5,158,324 | 10/1992 | Flesher | 280/770 |
| 5,195,778 | 3/1993 | Dismuke | 280/770 |
| 5,209,545 | 5/1993 | Slaugh | 296/136 |
| 5,280,989 | 1/1994 | Castillo | 296/136 |

*Primary Examiner*—Richard M. Camby
*Attorney, Agent, or Firm*—Douglas E. White

[57] ABSTRACT

An automobile hood cover is comprised of a flexible planar substrate of vinyl coated fabric or other plastic material, which substrate has substantially all of its exterior (outwardly facing) surface covered with protective and decorative lace means, namely, either lace cloth or lace indicia. The cloth or indicia form a lace pattern comprised of regularly recurring sets of discrete graphical motifs.

17 Claims, 4 Drawing Sheets though the cover were a less desirable appearance than bare paint—particularly if it were to be considered even less attractive than dirty or damaged paint. Accordingly, part of the utility of hood covers is to present as attractive and as distinctive an appearance as possible, even to the point of making a personal fashion statement.

AUTOMOBILE HOOD COVER

CROSS REFERENCE TO RELATED APPLICATIONS

This application is a continuation in part of U.S. application Ser. No. 29/044,244, filed Sep. 21, 1995.

FIELD OF THE INVENTION

This invention relates to covers for the front hood areas of automobiles, including light-duty pickup trucks, more particularly to a hood cover having a protective and decorative lace pattern on its outer surface.

BACKGROUND OF THE INVENTION

Automobile front end protective covers, colloquially known as "car bras," typically are fabricated from cloth having a solid black coating of vinyl or similar plastic (hereinafter collectively referred to as "coated fabric"). Means, such as straps, tethers, hook and loop fasteners, magnets and the like, are included for temporarily affixing such hood covers to the hood and front end of cars and pickups. Apertures are left in the body of the cover fabric for allowing light to pass out from the car's headlights, turn signals, fog lamps, etc. Open mesh and other means may be included for allowing air to reach the car's radiator.

A disadvantage of prior art hood covers is that they are difficult to maintain and keep clean, insofar as even a spot of soil (such as a smashed insect) visibly stands out in sharp relief For the same reason, tears, scratches, scuffs, cracks, peeling, and like signs of wear quickly become visible and shorten the effective life of the cover—if not from the point of view of effectiveness, at least from the point of view of aesthetic appeal. Aesthetic appeal is a principal function or utility of such covers, insofar as they are designed to protect the vehicle's hood area from unattractive paint scratches and chips and to protect the metal substrate from small dents known as "dings." Once applied, however, such covers often remain on the vehicle indefinitely. This effectively substitutes a new surface ornamentation (the cover) for the original surface ornamentation (body paint). For this reason, it would defeat the purpose of the cover were it to be viewed by the owner and the general public as having a less desirable appearance than bare paint—particularly if it were to be considered even less attractive than dirty or damaged paint. Accordingly, part of the utility of hood covers is to present as attractive and as distinctive an appearance as possible, even to the point of making a personal fashion statement.

There is a need, therefore, for an automobile hood cover which is attractive to purchasers and which does not loose its useful appearance as it becomes soiled and worn.

Prior developments in this field may be generally illustrated by reference to the following information disclosure statement:

U.S. PATENT DOCUMENTS

| Patent No. | Patentee | Issue Date |
|---|---|---|
| 5,158,324 | R. Flesher | Oct. 27, 1992 |
| 5,280,989 | R. Castillo | Jan. 25, 1994 |
| 5,209,545 | D. Slaugh | May 11, 1993 |
| 5,195,778 | K. Dismuke | Mar. 23, 1993 |

-continued

U.S. PATENT DOCUMENTS

| Patent No. | Patentee | Issue Date |
|---|---|---|
| 5,056,817 | K. Fuller | Oct. 15, 1991 |
| 4,997,229 | T. Swanson | Mar. 5, 1991 |
| 4,589,459 | L. Lantrip | May 20, 1986 |
| 4,219,218 | C. Waldon | Aug. 26, 1980 |

U.S. Pat. No. 5,158,324 teaches an automobile bra, the top portion of which "preferably has a surface which visibly differs from the magnetic base portion for ease of orientation at assembly. Designs, patterns, colors or other indicia may be printed or otherwise marked upon the flexible material" (column 2, line 16). Although no form or utility is specifically taught with respect to such designs, patterns, etc., it would appear that they were taught to aid in identifying or distinguishing the top of the protective cover from its magnetic base material.

U.S. Pat. No. 4,219,218 shows an automobile halter, or hood cover, with a design insignia patch.

U.S. Pat. No. 5,280,989 teaches a hood cover made of a visually clear material—in contrast to, e.g., the gray or black vinyl of the device of U.S. Pat. No. 4,219,218.

U.S. Pat. No. 5,195,778 shows an auto bra, or utility apron, with an open work or mesh webbing, which webbing has the utility of passing air to the engine while it is running.

U.S. Pat. No. 5,056,817 and U.S. Pat. No. 4,997,229 represent the visual norm in regard to vehicle body protective covers. The first deals with "limiting temperature rise" on the covered surface of a vehicle, and the latter deals with the method of its attachment to a vehicle. The rest of the patents are representative of what was found in a private search of the art.

The above patents illustrate a small sample of the shapes that hood covers may assume (which shapes are fabricated so as to mirror the shape of the front end of a particular model of car, or of that of a range of car models). The teachings of the above patents with respect to the seaming and shaping of automobile hood covers, as well as with respect to hood cover affixing means, which teachings are not a novel part of the present invention, are incorporated by reference herein.

SUMMARY OF THE INVENTION

As used herein, a "pattern" means an assembly of one or more regularly recurring sets of discrete graphical motifs, the motifs within each recurring set being substantially identical to one another. "Open work" means to be characterized by regular and substantial spacing between lines or threads. The "line" of a cloth thread is the longitudinal axis thereof.

"Lace means" is defined herein as apparatus for forming a pattern, said means having spaced-apart pattern lines (indicia or thread) of substantially uniform thickness arranged into the pattern throughout an open work matrix of regularly spaced matrix lines (indicia or thread). It can be seen that either true lace cloth or artificial indicia lines can comprise the means to form a lace pattern.

Preferably, the matrix is rectilinear and both the pattern lines and the matrix lines are monochromatic. Preferably, the motifs of the pattern formed by the pattern lines are open, curvilinear, and web-like.

Preferably, the lace means is comprised of lines (whether indicia or threads) of high color value (lightness) formed against a background of low color value (darkness). Alternatively, the indicia lines or cloth threads may be of low color value (dark, e.g., black) against a high value background (light, e.g., white). When measured according to the ISCC-NBS system, the color of the lines or threads and the color of the background preferably will have a Munsell value difference of at least four (4) in order to provide adequate contrast.

The present invention is a design for an auto bra, the point of novelty comprising any lace means glued on or fused into (in the case of cloth) or printed on, painted on, fused into, cut into, or embossed on (in the case of indicia) the exterior surface of an automobile hood cover. Again, the shape of the cover, of which there are many types and sizes, is not a part of the invention, nor is the exact pattern of a particular lace means.

Preferably the lace cloth or lace pattern indicia (including background matrix) is of a white or other light color superimposed over a black or other dark colored vinyl cloth background substrate. Alternatively, the lace means is of a black or other dark color superimposed over a white or other light colored vinyl cloth substrate. Alternatively, transparent plastic may be substituted for the vinyl cloth and the lace means chosen to be contrasting in color value to the exterior paint of the automobile, which paint will form the background.

The exterior lace cloth or lace pattern indicia of this invention finds utility in hiding the spots, stains, tears, scratches, scuffs, cracks, peeling, and like signs of wear that accumulate over time on the body of the cover.

Furthermore, the lace cloth or lace pattern indicia, normally comprising an additional layer of material (whether cloth, paint, plastic resin or the like), adds physical durability to the cover. For example, is well known that the spread of a crack or tear through a material slows or stops as the line of the crack or tear intersects a thread, other raised line or similar surface irregularity found on the material, particularly when the line is transverse to the direction which the crack or tear is spreading.

Also, the lace cloth or pattern indicia is desirably decorative. It lends an appearance of delicacy and elegance to the cover—insofar as lace is known to be a fine material, suitable for wedding dresses, gowns and the like. Finally, given that such automobile hood covers are known as car "halters" or "bras," the use of lace therein fancifully calls to mind the use of lace in women's brassieres.

FEATURES AND ADVANTAGES

An object of this invention is to disclose an automobile hood cover apparatus including a plastic-coated cloth substrate having interior and exterior surfaces. Indicia lines cover substantially all of the exterior surface of the substrate and form an assembly of one or more regularly recurring sets of discrete graphical motifs, the motifs within each recurring set being substantially identical to one another. Preferably, the indicia have spaced-apart pattern lines of substantially uniform thickness and of first uniform monochromatic color value and have an open work rectilinear matrix of regularly spaced matrix lines of substantially uniform thickness and of the first uniform monochromatic color value. The pattern lines are arranged into the motifs throughout the matrix.

Another feature or object is to disclose pattern lines that form the curvilinear motifs of traditional lace.

Yet another feature is the substrate preferably is opaque and monochromatic and has a uniform second color value.

Still another feature is the first color value preferably is higher than the second by a Munsell value of at least four.

Yet another feature is the indicia pattern lines and matrix lines are printed on, painted on, fused into, cut into, or embossed on the exterior surface of the substrate.

As another feature, the device will have apertures cut through the indicia and substrate for revealing lights and other features of the car or light truck automobile.

Another feature is a plurality of panels of the substrate, the assembly of one or more regularly recurring sets of discrete graphical motifs being regular and uniform substantially throughout each panel.

Still another feature is an alternate embodiment wherein the pattern and matrix lines are the longitudinal axes of cloth threads (i.e., lace cloth is used over the substrate). In yet another embodiment, the substrate is transparent plastic.

Another feature is an apparatus that is easy to use, attractive in appearance and suitable for mass production at relatively low cost.

Other novel features which are characteristic of the invention, as to organization and method of operation, together with further objects and advantages thereof will be better understood from the following description considered in connection with the accompanying drawing, in which a preferred embodiment of the invention is illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Figure 1:
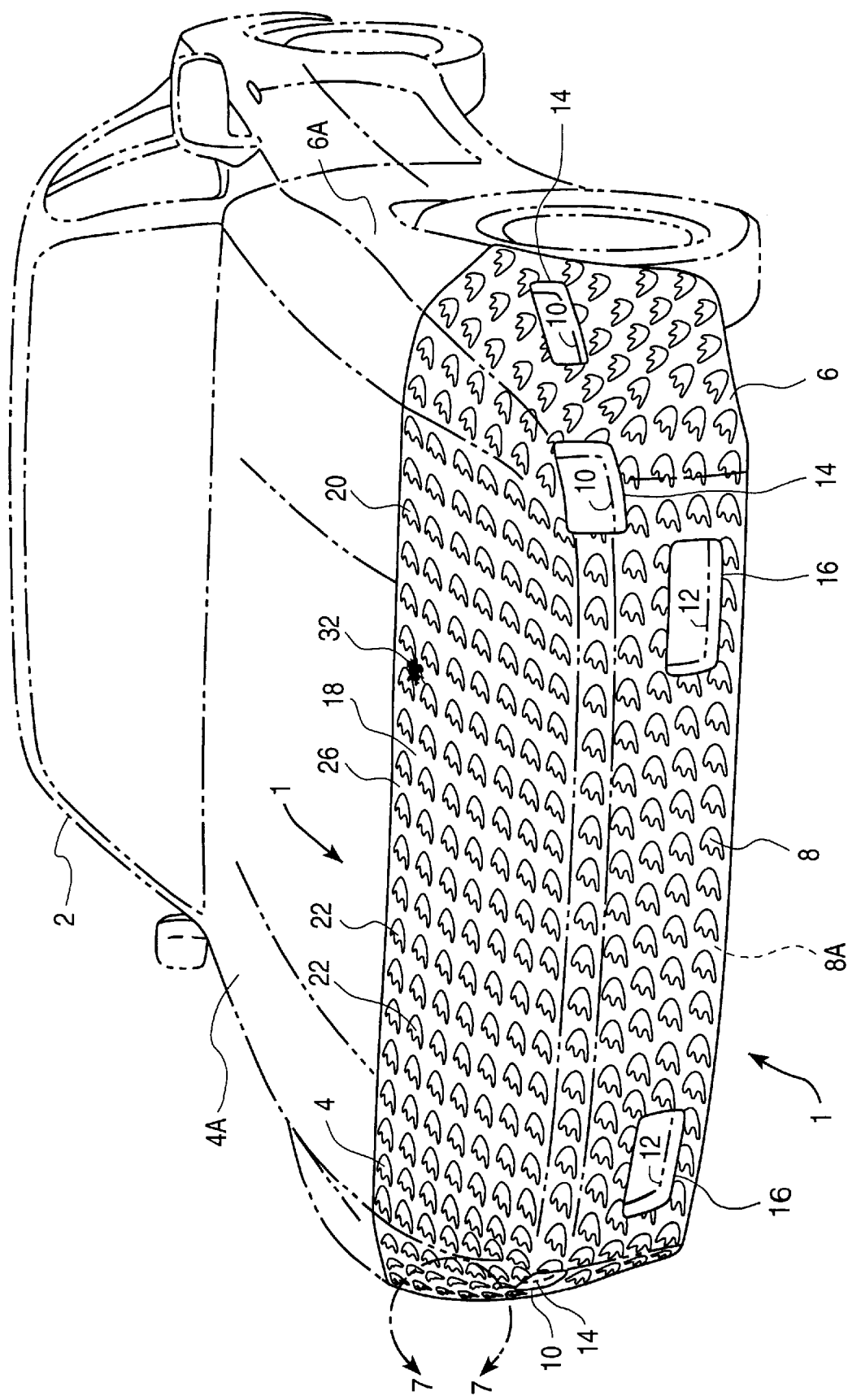
FIG. 1 is a perspective view of a preferred automobile hood cover of this invention.

| DRAWING REFERENCE NUMERALS | |
|---|---|
| 1 | hood cover |
| 2 | automobile |
| 4 | hood panel |
| 4a | hood |
| 6 | fender panel |
| 6a | fender |
| 8 | bumper panel |
| 8a | bumper |
| 10 | turn signal |

-continued

DRAWING REFERENCE NUMERALS

| | |
|---|---|
| 12 | headlight |
| 14 | turn signal aperture |
| 16 | headlight aperture |
| 18 | coated fabric substrate |
| 20 | pattern |
| 22 | pattern motif |
| 24 | rectilinear matrix |
| 26 | lace means |
| 28 | indicia |
| 30 | backing |
| 32 | spot |
| 118 | coated fabric substrate |
| 120 | pattern |
| 122 | pattern motif |
| 122a | pattern motif |
| 124 | rectilinear matrix |
| 126 | lace means |
| 128 | lace cloth |

It is to be noted that, for convenience, the last two positions of the reference numerals of alternative embodiments of the invention duplicate those of the numerals of the embodiment of FIG. 1, where reference is made to similar or corresponding parts. However, it should not be concluded merely from this numbering convention that similarly numbered parts are equivalents.

DETAILED DESCRIPTION OF THE INVENTION

Referring to FIG. 1, there is illustrated therein an automobile hood cover 1 of the present invention. Hood cover 1, formed into any of a wide variety of standard shapes and sizes, is fitted on a automobile 2 having a hood 4a, a pair of right and left fenders 6a, and a front bumper 8a. The hood cover 1 covers the forward portions of the hood 4a and fenders 6a, as well as substantially all of the bumper 8a.

The automobile 2 further has a standard set of turn signal lights 10 and head-lights 12, and possibly additional accessories which must remain visible, such as fog lights. Piercing the hood cover 1 at pre-established locations are a complementary set of turn signal apertures 14 and headlight apertures 16. This much is standard in the art.

The hood cover 1 is comprised of a flexible planar substrate or body of vinyl or other plastic coated fabric 18, which substrate 18 has substantially all of its exterior (outwardly facing) surface covered with lace means 26, namely, either lace cloth or lace indicia, said cloth or indicia forming a lace pattern 20 comprised of a regular series of pattern motifs 22. The substrate 18 has a plurality of seamed panels, including, among others known in the art, a hood panel 4, a pair of right and left fender panels 6, and a front bumper panel 8.

Figure 2:
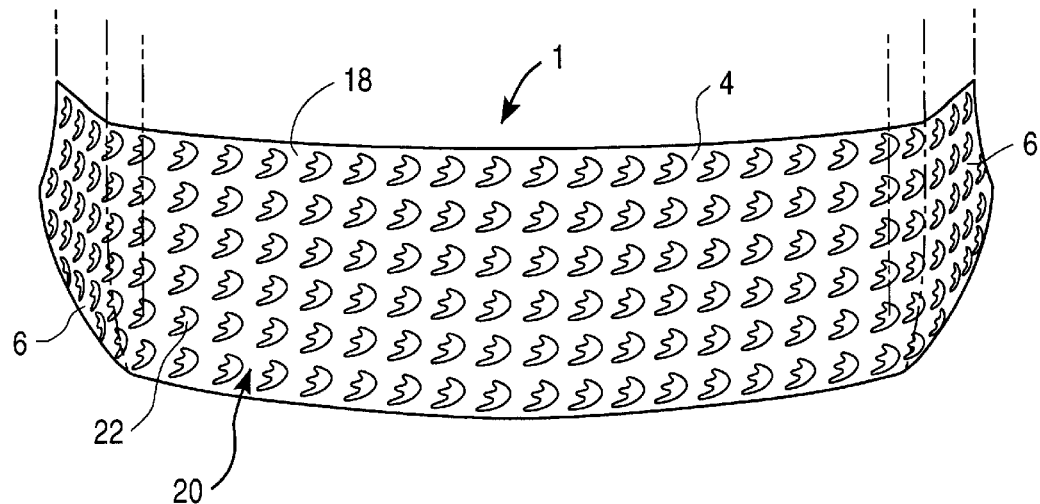
FIG. 2 is a top view of the cover of FIG. 1, showing the pattern thereof in schematic regularity.
Figure 3:
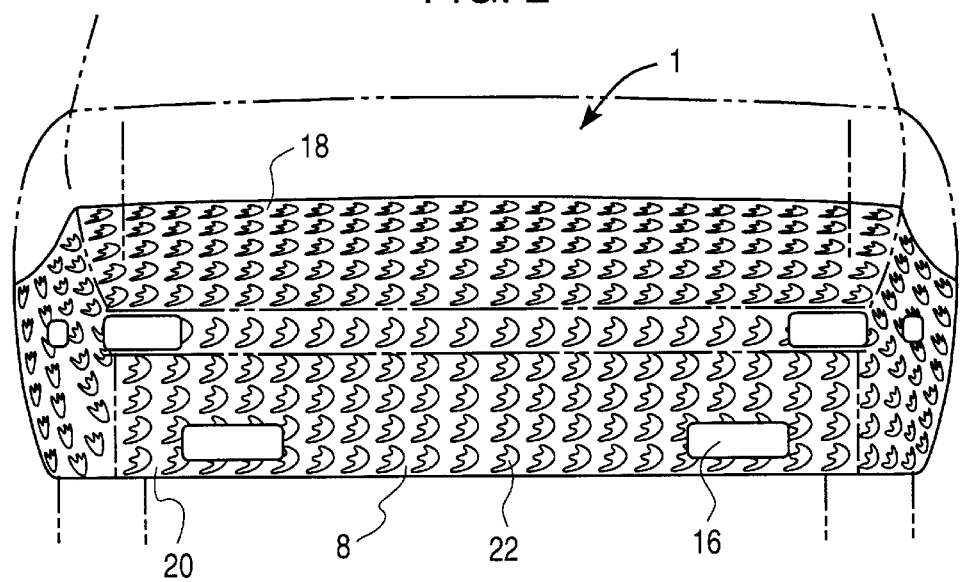
FIG. 3 is a front elevation of the cover of FIG. 1, showing the pattern thereof in schematic regularity.
Figure 4:
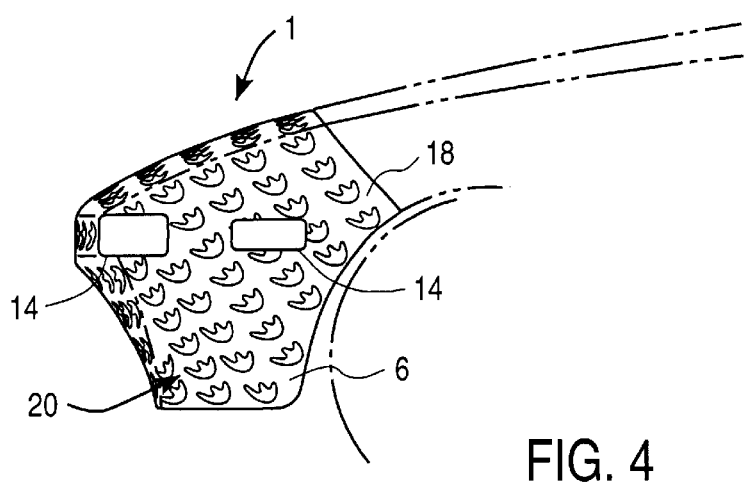
FIG. 4 is a right side elevation of the cover of FIG. 1, showing the pattern thereof in schematic regularity.

FIGS. 2–4 are a series of views illustrating the regularity of pattern 20 as it is formed on flat panels of the hood cover 1. The regularity of the shape and size of the pattern motifs 22 of the pattern in these figures is somewhat schematic, in that in the actual environment of a car or pickup, relatively little of the hood cover 1 lies flat over large areas. The material stretches in practice and, furthermore, it is not possible to show the entire hood cover 1 without distorting, through perspective, the actual regularity of the lace pattern 20. Finally, portions of the pattern will be cut off at seams, and may not match up with cut-off portions on the other side of seams. However, the lace means 26 covering the fabric substrate 18 within each of the panels 4, 6, 8 of the hood cover 1 will comprise a substantially regular and uniform pattern.

Figure 5:
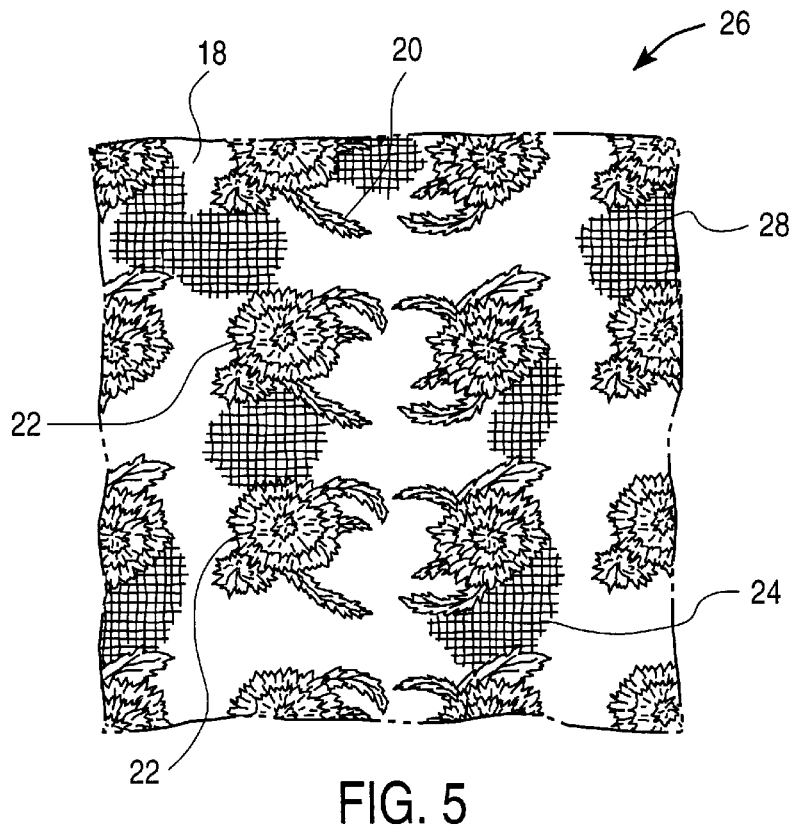
FIG. 5 is a detail view of the lace pattern of the cover of FIG. 1.
Figure 6:
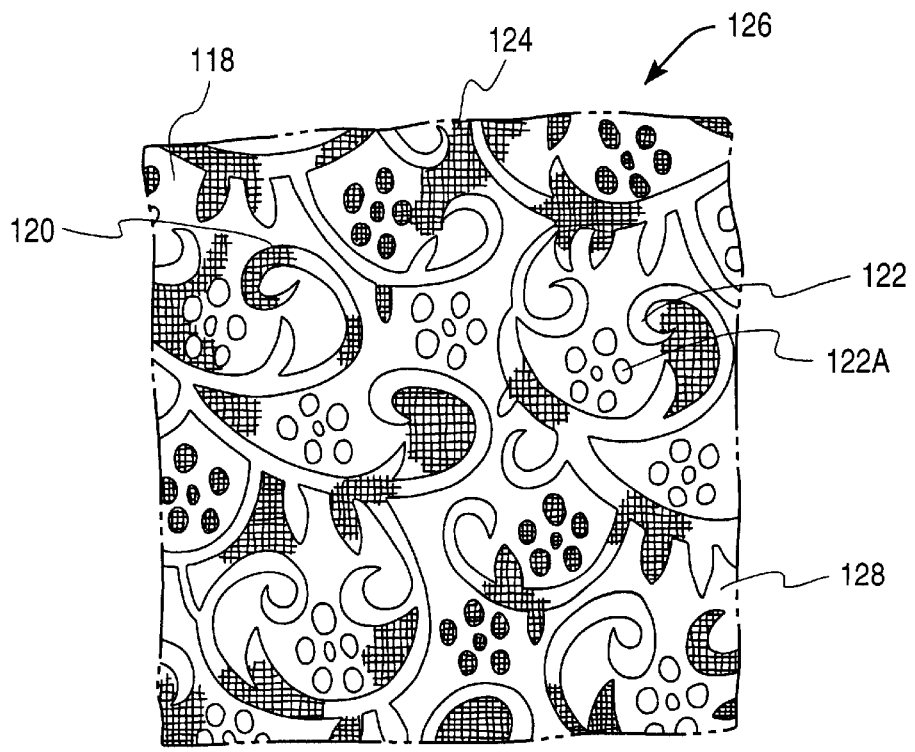
FIG. 6 is a detail view of an alternate lace pattern for use with a cover of this invention.

Turning to FIGS. 5 and 6, there can be viewed therein substantially regular (except for irregularities at seams, as described immediately above) lace means 26 and 126, respectively, that may be formed on substantially the entire exterior surface of a hood cover 1. These are but two examples of many available lace means that are acceptable for use in this invention.

FIG. 5 shows lace means 26 of the embodiment of FIG. 1, namely, a pattern 20 comprised of a two dimensional series of regularly recurring motifs 22 formed in or on a rectilinear line matrix 24. In the case of FIG. 1–5, the lace means 26 is comprised of indicia 28 that are printed on, silk screened on, painted on, cut into, or embossed on the exterior surface of the coated fabric substrate 18 of the automobile bra or hood cover 1.

FIG. 6 shows actual lace cloth 128 which may be substituted as lace means 126 in this invention for the indicia 28 of the embodiment of FIG. 1. Lace means 126 is a thread-formed lace pattern 120 comprised of sets of two dimensional series of regularly recurring motifs 122, 122a woven in a rectilinear line matrix of open-weave threads 124. The lace cloth 128 may be glued, heat sealed or otherwise securely affixed onto the exterior surface of a plastic-coated fabric substrate 118.

Figure 7:
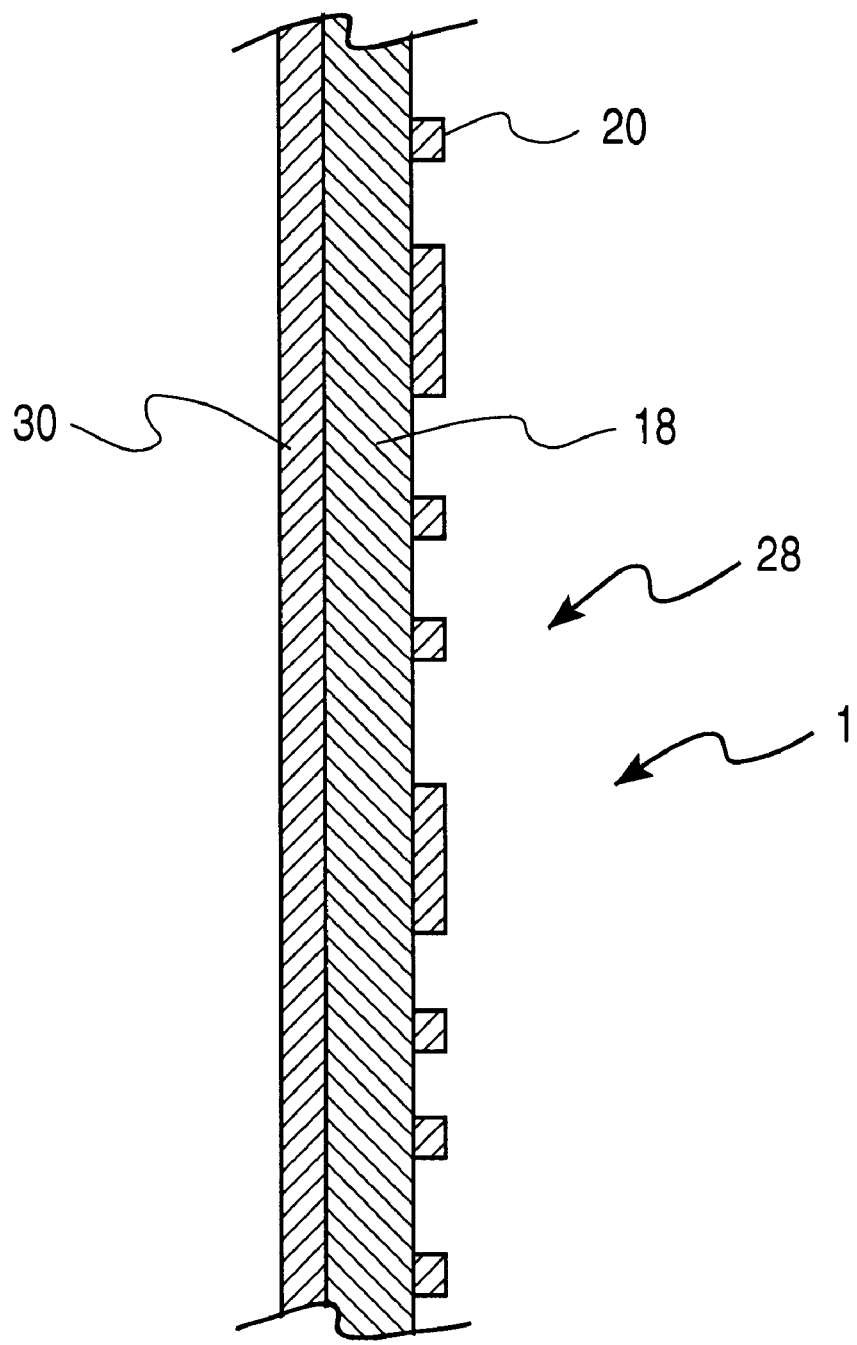
FIG. 7 is a broken sectional side view of the layers of the cover of FIG. 1, taken along line 7—7 of FIG. 1.

FIG. 7 is a broken cross-section of a typical panel of the hood cover 1. The coated fabric substrate 18 is padded on its interior (inwardly facing) surface with a layer of soft backing 30, typically felt. The exterior surface of the substrate 18 is covered with indicia 28 forming a pattern 20. The linear, thread-like, nature of the pattern 20 has an irregular cross-section rising above the substrate 18, as seen in FIG. 7 (wherein some indicia lines are intersected obliquely—causing an apparent variation in what, in fact, are uniform thicknesses). This provides extra durability to the hood cover 1 and extra protection for the automobile 2. At the same time, by economizing on the use of material (as opposed, say, to evenly spread material covering the entire coated fabric substrate 18) the weight of the hood cover 1 is minimized.

Through use of the present invention, an otherwise unsightly spot 32 (FIG. 1) is difficult to differentiate visually, as are cracks, scratches, chips, scuffs and the like.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like.

For example, the substrate upon which the lace pattern is formed need not be coated fabric. It may be clear plastic, leather or other alternate flexible planar material. Therefore, the above description and illustrations should not be construed as limiting the scope of the invention, which is defined by the appended claims.

What is claimed is:

1. Automobile hood cover apparatus including:
   a flexible planar substrate having an interior and an exterior surface;
   means for affixing the substrate to the hood of an automobile; and
   lace means for forming a pattern, the lace means covering substantially all of the exterior surface of the substrate and having spaced-apart pattern lines, and an open work matrix of regularly spaced matrix lines of substantially uniform thickness, the pattern lines arranged into the pattern substantially throughout the matrix.

2. The apparatus of claim 1 wherein:

the pattern lines and the matrix lines are monochromatic and have a uniform first color value.

3. Automobile hood cover apparatus including:

a flexible planar substrate having an interior and an exterior surface;

means for affixing the substrate to the hood of an automobile; and lace means for forming a pattern, the lace means covering substantially all of the exterior surface of the substrate and having spaced-apart pattern lines, and an open work matrix of regularly spaced matrix lines of substantially uniform thickness, the pattern lines arranged into the pattern substantially throughout the matrix, wherein the pattern lines and the matrix lines are monochromatic and have a uniform first color value, and the matrix is rectilinear.

4. The apparatus of claim 3 wherein:

the pattern lines form curvilinear motifs.

5. The apparatus of claim 4 wherein:

the substrate is monochromatic and has a uniform second color value, and the first and second color values differ by a Munsell value of at least four.

6. The apparatus of claim 5 wherein:

the first color value is higher than the second.

7. The apparatus of claim 6 wherein:

the pattern lines and the matrix lines are indicia printed on, painted on, fused into, cut into, or embossed on the exterior surface of the substrate.

8. The apparatus of claim 6 wherein:

the pattern lines and the matrix lines are the longitudinal axes of cloth threads glued on or fused into the exterior surface of the substrate.

9. The apparatus of claim 6 further including:

felt backing affixed to the interior surface of the substrate.

10. Automobile hood cover apparatus including:

a flexible planar substrate having an interior and an exterior surface;

means for affixing the substrate to the hood of an automobile; and lace means for forming a pattern, the lace means covering substantially all of the exterior surface of the substrate and having spaced-apart pattern lines, and an open work matrix of regularly spaced matrix lines of substantially uniform thickness, the pattern lines arranged into the pattern substantially throughout the matrix, wherein the pattern lines and the matrix lines are monochromatic and have a uniform first color value, and the substrate is transparent.

11. Automobile hood cover apparatus including:

a plastic-coated cloth substrate having interior and exterior surfaces;

means for affixing the substrate to the hood of an automobile; and indicia covering substantially all of the exterior surface of the substrate and forming an assembly of one or more regularly recurring sets of discrete graphical motifs, the motifs within each recurring set being substantially identical to one another, the indicia having spaced-apart pattern lines of substantially uniform thickness and of first uniform monochromatic color value, and an open work rectilinear matrix of regularly spaced matrix lines of substantially uniform thickness and of the first uniform monochromatic color value, the pattern lines arranged into the motifs throughout the matrix.

12. The apparatus of claim 11 wherein:

the pattern lines form curvilinear motifs.

13. The apparatus of claim 12 wherein:

the substrate is opaque and monochromatic and has a uniform second color value.

14. The apparatus of claim 13 wherein:

the first color value is higher than the second by a Munsell value of at least four.

15. The apparatus of claim 14 wherein:

the pattern lines and matrix lines are printed on, painted on, fused into, cut into, or embossed on the exterior surface of the substrate.

16. The apparatus of claim 15 further including:

apertures cut through the indicia and substrate.

17. The apparatus of claim 16 further including:

a plurality of panels of the substrate, the assembly of one or more regularly recurring sets of discrete graphical motifs being regular and uniform substantially throughout each panel.

* * * * *